United States Patent
Klaiber et al.

(10) Patent No.: US 7,937,566 B1
(45) Date of Patent: May 3, 2011

(54) PROCESSING BYPASS DIRECTORY TRACKING SYSTEM AND METHOD

(76) Inventors: Alexander Klaiber, Mountain View, CA (US); Guillermo Rozas, Los Gatos, CA (US)

( * ) Notice: Subject to any disclaimer, the term of this patent is extended or adjusted under 35 U.S.C. 154(b) by 0 days.

(21) Appl. No.: 12/353,064

(22) Filed: Jan. 13, 2009

Related U.S. Application Data

(63) Continuation of application No. 11/540,789, filed on Sep. 29, 2006, now Pat. No. 7,478,226.

(51) Int. Cl.
*G06F 9/34* (2006.01)

(52) U.S. Cl. .................................................. 712/218

(58) Field of Classification Search .................. 711/138; 712/216, 217, 218
See application file for complete search history.

(56) References Cited

U.S. PATENT DOCUMENTS

| | | | |
|---|---|---|---|
| 5,905,855 A | 5/1999 | Klaiber et al. |
| 6,000,016 A | 12/1999 | Curtis et al. |
| 6,016,540 A | 1/2000 | Zaidi et al. |
| 6,112,019 A | 8/2000 | Chamdani et al. |
| 6,363,336 B1 | 3/2002 | Banning et al. |
| 6,594,821 B1 | 7/2003 | Banning et al. |
| 6,668,287 B1 | 12/2003 | Boyle et al. |
| 6,725,361 B1 | 4/2004 | Rozas et al. |
| 6,738,893 B1 | 5/2004 | Rozas |
| 6,748,589 B1 | 6/2004 | Johnson et al. |
| 6,826,682 B1 | 11/2004 | Rozas et al. |
| 6,851,040 B2 | 2/2005 | Anvin et al. |
| 7,015,718 B2 | 3/2006 | Burky et al. |
| 7,062,631 B1 | 6/2006 | Klaiber et al. |
| 7,089,397 B1 | 8/2006 | Anvin et al. |
| 7,089,404 B1 | 8/2006 | Rozas et al. |
| 7,096,345 B1 | 8/2006 | Chen et al. |
| 7,096,460 B1 | 8/2006 | Banning et al. |
| 7,149,851 B1 | 12/2006 | Rozas et al. |
| 7,149,872 B2 | 12/2006 | Rozas et al. |
| 7,225,299 B1 | 5/2007 | Rozas et al. |
| 7,249,246 B1 | 7/2007 | Banning et al. |
| 7,310,723 B1 | 12/2007 | Rozas et al. |
| 7,334,109 B1 | 2/2008 | Anvin et al. |
| 7,337,307 B1 | 2/2008 | Rozas et al. |
| 7,337,439 B1 | 2/2008 | Johnson et al. |
| 7,376,798 B1 | 5/2008 | Rozas |
| 7,380,096 B1 | 5/2008 | Rozas et al. |
| 7,380,098 B1 | 5/2008 | Anvin et al. |
| 7,404,181 B1 | 7/2008 | Banning et al. |

OTHER PUBLICATIONS

Parag Gupta, Alexander Klaiber, and James Van Zoeren. Title: A Processing Bypass Register File System and Method. U.S. Appl. No. 11/540,766, filed Sep. 29, 2006.
Non-Final Office Action Mailed May 21, 2008; U.S. Appl. No. 11/540,766.
Non-Final Office Action Mailed Jan. 23, 2009; U.S. Appl. No. 11/540,766.
Final Office Action Mailed Aug. 11, 2009; U.S. Appl. No. 11/540,766.
Notice of Allowance Mailed Sep. 5, 2008; 7,478,226.
Notice of Allowance Mailed May 23, 2008; 7,478,226.
Advisory Action Mailed Jan. 29, 2010; U.S. Appl. No. 11/540,766.
Notice of Allowance Dated Apr. 2, 2010; U.S. Appl. No. 11/540,766.

*Primary Examiner* — William M Treat

(57) ABSTRACT

A processing bypass directory system and method are disclosed. In one embodiment, a bypass directory tracking process includes setting bits in a bypass directory when a corresponding architectural register is written. The configuration of the bits is utilized to determine which stage of a bypass path processing information is at.

27 Claims, 6 Drawing Sheets

PROCESSING BYPASS DIRECTORY TRACKING SYSTEM AND METHOD

RELATED UNITED STATES PATENT APPLICATION

This application is a Continuation Application of the co-pending, commonly-owned U.S. patent application Ser. No. 11/540,789, filed Sep. 29, 2006, by A. Klaiber et al., and entitled "A Processing Bypass Directory Tracking System and Method," which is incorporated by reference in its entirety.

FIELD OF THE INVENTION

This invention relates to the field of processing information. In particular, the present invention relates to processing data paths and corresponding control systems and methods.

BACKGROUND OF THE INVENTION

Pipelined processor data paths often stage (temporarily store) results of information processing for some number N of cycles before "retiring" to an architectural register file.

Traditionally, this "staging" is implemented via a series i=1 ... N of storage elements (hereafter referred to as a "bypass register file"). Every cycle, the data from storage element number N may be written (retired) to the architectural register file, data from all other storage elements i is copied to storage element (i+1), and a new result (if any) is written into storage element number 1. Each result is therefore copied N times before retiring, and on every successive cycle, a given result will reside in a different physical location.

When the processing element wishes to read the latest value of an architectural register, control logic needs to determine whether the most recent result for that register resides in the architectural register file or the bypass register file and, if the latter, in which of the N stages of the bypass register file. The control logic then generates control signals to cause the data path to deliver ("forward") the most recent copy of the desired register to the processing element.

A traditional implementation of the control logic keeps a list of the register specifiers for all currently in-flight register writes, compares (via associative lookup) the register specifier for the new read request against all writes, and picks (via a prioritizer circuit) the most recent one for forwarding. This traditional implementation is power, area and wiring intensive, and does not scale well as the pipeline length and number of functional units in the processor increase.

SUMMARY

A processing bypass directory tracking system and method are disclosed. In one embodiment, a bypass directory tracking process includes setting bits in a bypass directory when a corresponding architectural register is written. The bits are selectively cleared in the bypass directory each cycle. The configuration of the bits is utilized to determine whether the most recent result for a given architectural register resides in the architectural register file or the bypass register file and, if the latter, where in the bypass register file.

BRIEF DESCRIPTION OF THE DRAWINGS

FIGS. 5A through 5F show an exemplary evolution of a directory state over six cycles.

DETAILED DESCRIPTION

Figure 1:
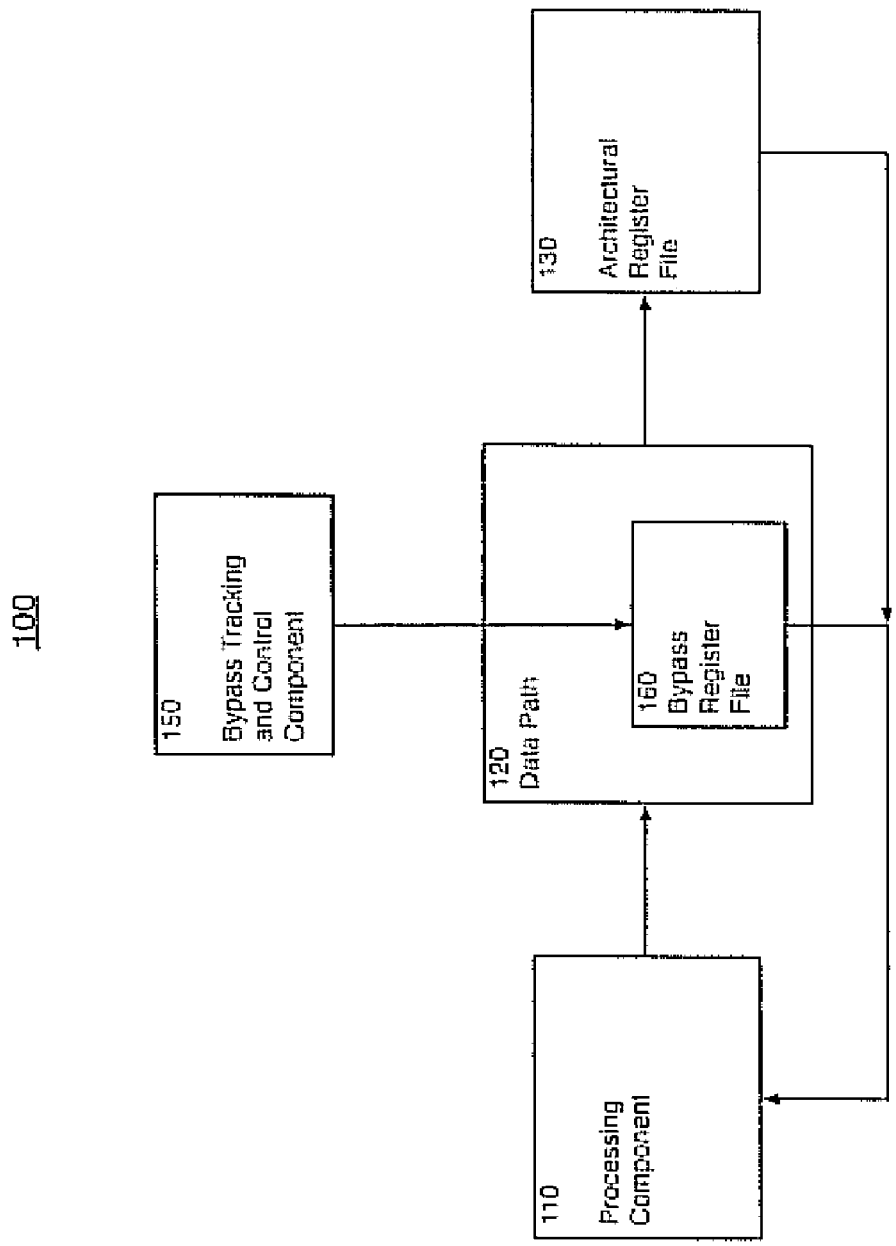
FIG. 1 is a block diagram of an exemplary information processing pipeline in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

In one embodiment, a present processing bypass directory tracking system and method include novel control logic for tracking and locating results in the bypass register file, and generating control signals to effect forwarding. The present control logic can be utilized with traditional approaches in which "staging" is implemented via a series i=1 . . . N of storage elements (hereafter referred to as a "bypass register file") and each result is physically shifted through all N storage elements before retiring with a given result residing in a different physical location. The present invention can also be utilized with an alternative implementation, as described in the co-pending application entitled "A PROCESSING BYPASS REGISTER FILE SYSTEM AND METHOD" (Ser. No. 11/540,766, filed Sep. 29, 2006), which writes new results into the location in the bypass register file indicated by a rotating head pointer, and the result remains in the same location until it is retired into the architectural register file.

FIG. 1 is a block diagram of information processing pipeline 100 in accordance with one embodiment of the present invention. Information processing pipeline 100 includes processing component 110, data path 120, bypass register file 160, bypass tracking and control component 150 and architectural register file 130. Processing component 110 is coupled to data path 120 which in turn is coupled to bypass tracking and control component 150 and architectural register file 130. Processing component 110 processes information and delivers the results to data path 120. Data path 120 stages and delivers processing information to architectural register 130. Bypass tracking and control component 150 tracks and controls the progress of the processing information through data path 120, including selecting data from either the bypass register file 160 or architectural register file 130 to be forwarded to the processing component 110.

Figure 2:
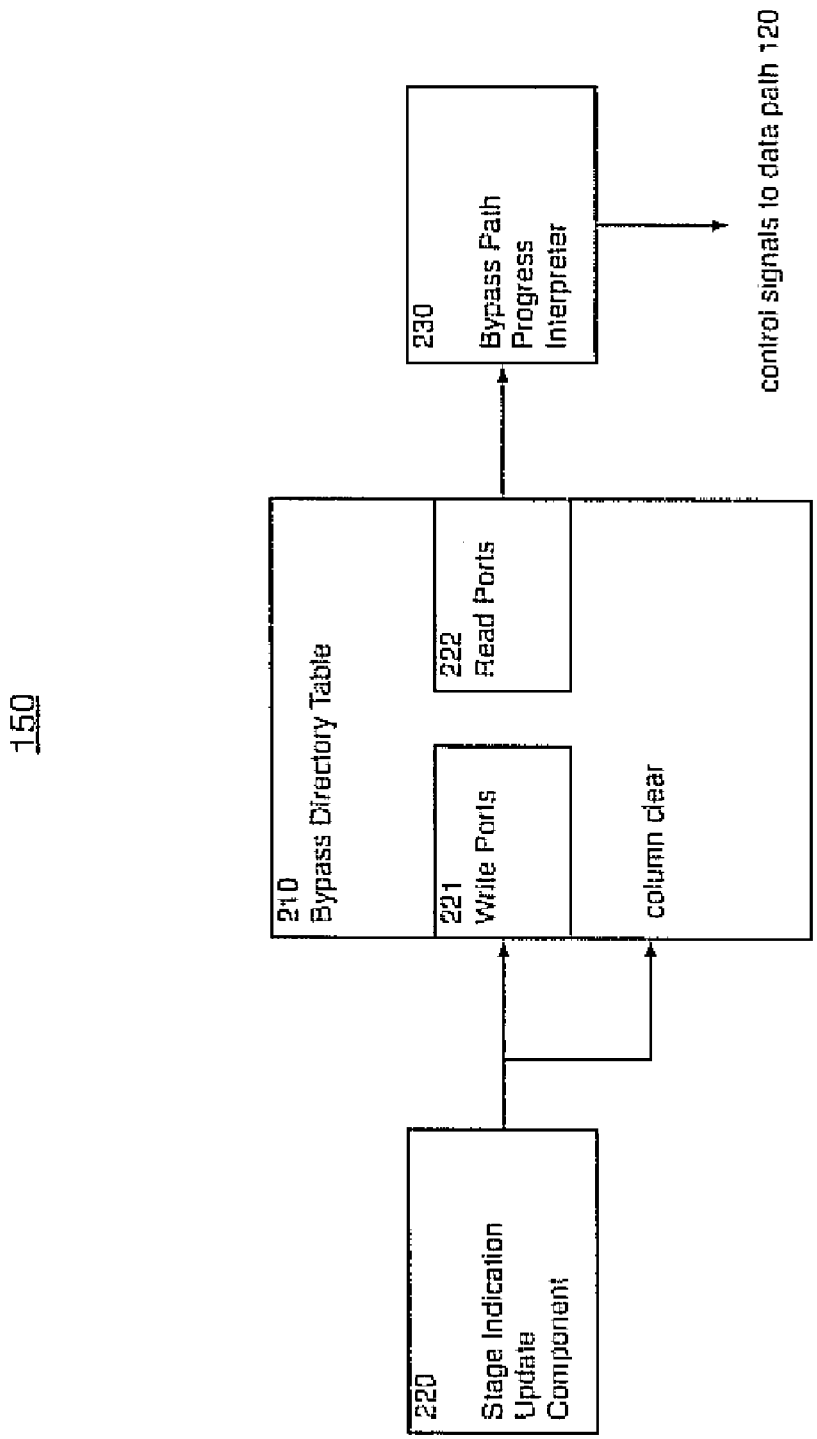
FIG. 2 is a block diagram of an exemplary bypass path tracking system in accordance with one embodiment of the present invention.

FIG. 2 is a block diagram of bypass tracking and control system 150 in accordance with one embodiment of the present invention. Bypass tracking and control system 150 includes a bypass directory table 210, a stage indication update component 220 and a bypass path progress interpreter 230. Directory table 210 is coupled to a stage indication update component 220 and bypass path progress interpreter 230.

The components of bypass path tracking system 200 cooperatively operate to track progress of processing information through a data path. Bypass directory table 210 stores bypass path stage indications. Stage indication update component 220 manipulates the bypass path stage indications to correspond to the progress of processing information through a bypass path. Bypass path progress interpreter 230 interprets the bypass path stage indications and determines whether a desired result is located in the architectural register file or in the bypass (and, if so, where).

In one embodiment, the bypass directory table 210 is organized as a table array of M rows and N columns, where M is the number of architectural registers and N is the depth of the result "pipeline." A rotating head-pointer, which moves "left" one position (with wraparound) every cycle, indicates a "current column" in the table. When an architectural register is written, all N bits are set in the directory table row corresponding to the architectural register. Every cycle, all bits in the table column indicated by the head-pointer are cleared.

When all N bits in the directory table's row corresponding to a given architectural register are clear, the register's up-to-date value is found in the architectural register file. Otherwise, the first non-zero bit (in the table's row of N bits) to the right (with wraparound) of the current head pointer indicates which slot in the bypass register file contains the most recent value. In one exemplary implementation, this bit can be determined by locating the (single) bit that is set and whose left neighbor (with wraparound) is not set. How this information is further decoded to control a bypass register file depends on the implementation of the bypass register file.

The present invention can be used to control a traditional bypass register file (where each cycle, results are copied from one state element to the next one "closer" to the architectural register file), but it may also be used to control a bypass register files as described in the co-pending application entitled "A PROCESSING BYPASS REGISTER FILE SYSTEM AND METHOD" (Ser. No. 11/540,766, filed Sep. 29, 2006), where each result in the bypass register file remains in the same location within the bypass register file until retirement. By picking locations for new results in the bypass register file in a manner synchronized with the "current column" pointer in the bypass directory, control signals are simplified, as illustrated in FIG. 4.

Figure 4:
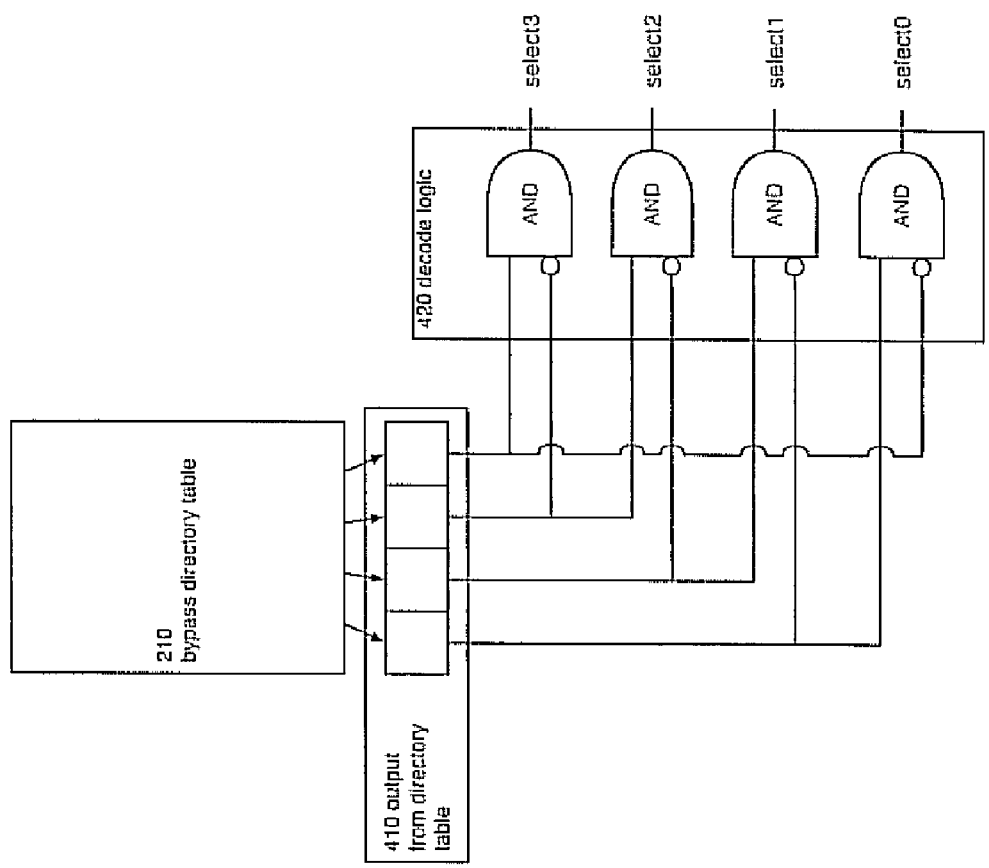
FIG. 4 shows exemplary computation of forwarding-control "select" signals for a bypass register file, based upon information read from the bypass directory table.

FIG. 4 shows decode logic 420 which computes "select" signals from the output 410 of the bypass directory state bits, for an exemplary case with N=4. From the N=4 bits read out of the bypass directory table, the N select signals are computed. The illustrated method of updating the directory and computing the select signals ensures that select signals are either one-hot or all-zero. Therefore, the select signals can directly select which entry to read from a bypass register, if the bypass register file retains results in the same physical location within the bypass register file until retirement.

Figure 6:
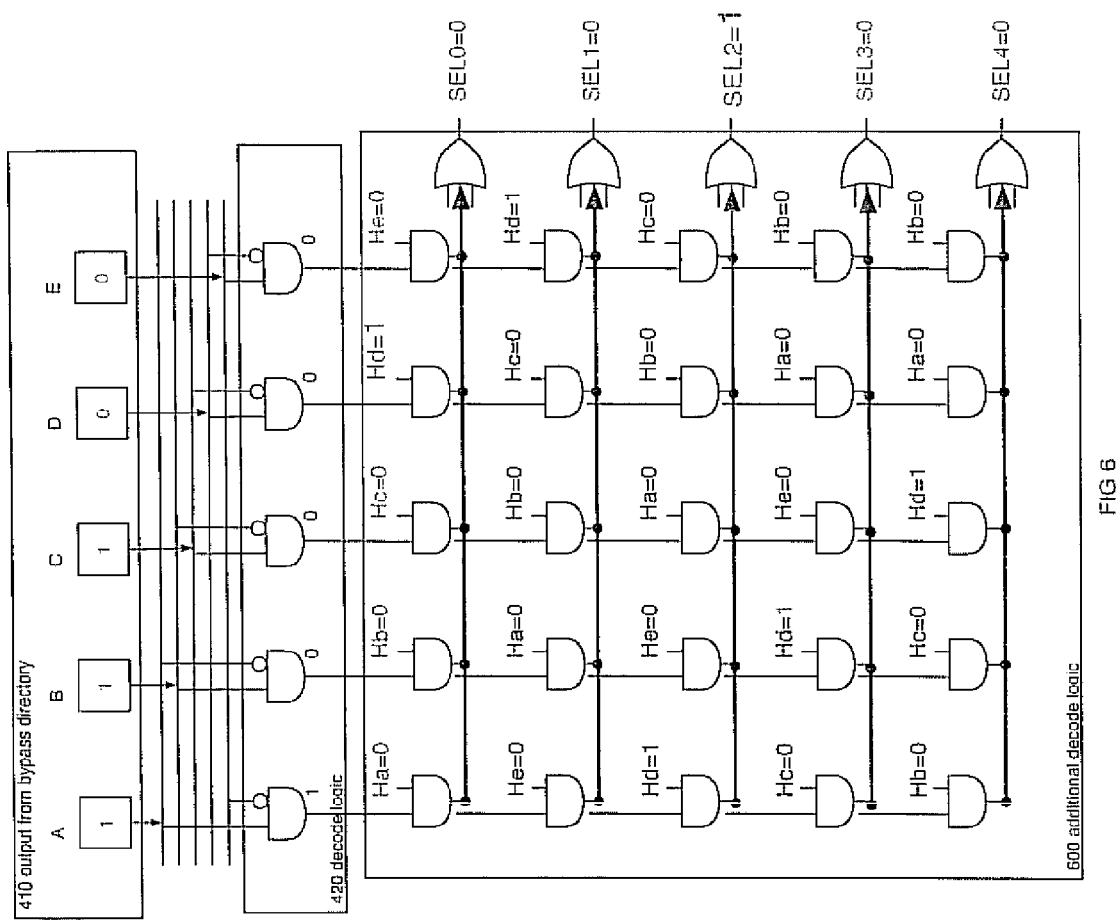
FIG. 6 shows exemplary logic that decodes the output of the bypass directory table for controlling a traditional bypass network.

For traditional bypass register files, where results physically move to a different location each cycle, the control logic must determine how many cycles ago (relative to the current position of the bypass directory's head pointer) a given result was computed; this information corresponds to the index into a traditional bypass register file. FIG. 6 illustrates an embodiment of additional control logic 600 that can derive this information from the output of decode logic 420, for an exemplary case with N=5. The figure also shows exemplary values read from the bypass directory and head pointer, and the resulting output of the control logic.

The additional decoding logic 600 takes as additional input a one-hot encoded version of the current head pointer: signals Ha through He. (The exemplary values in the figure show the head pointer in position "D," as indicated by Hd=1.) The select signals SEL0 through SEL4 are computed by AND-ing the outputs from decode logic 420 with successively rotated copies of the one-hot encoded head pointer and OR-ing the N products in each row. By construction, the SEL signals are either all-zero or one-hot. In the example in FIG. 6, SEL2=1, indicating that the result was written two cycles ago, which in turn indicates the location within a traditional bypass register file where the result can be found.

In one embodiment, the number of write ports 221 associated with bypass directory table 210 corresponds to a number of results per cycle produced by the processing component 110. The number of read ports 222 associated with bypass directory table 210 corresponds to a number of processing source operands read per cycle, plus one additional read port for retirement to the architectural register file.

Figure 3:
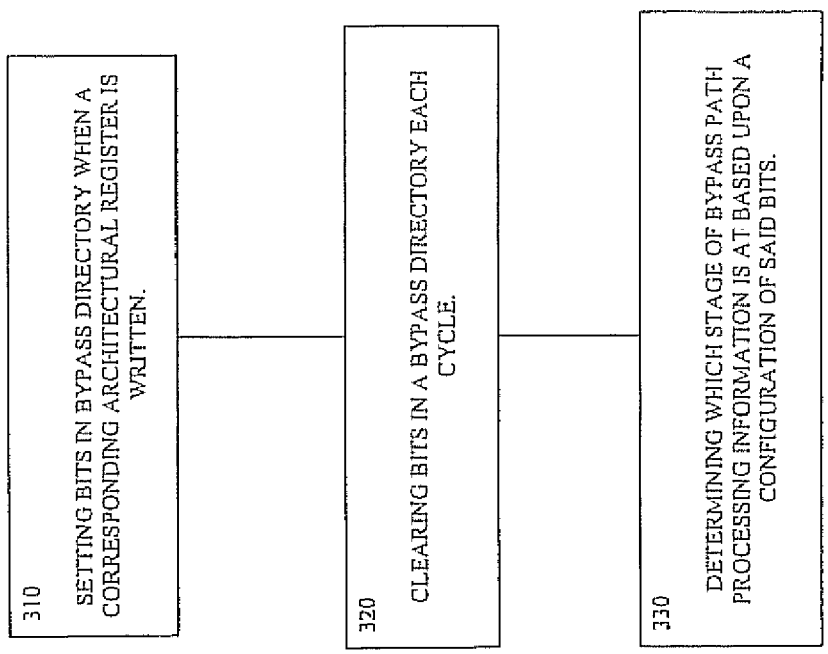
FIG. 3 is a flow chart of an exemplary bypass tracking process in accordance with one embodiment of the present invention.

FIG. 3 is a flow chart of bypass tracking process 300 in accordance with one embodiment of the present invention.

At block 310, bits in a bypass directory are set when a corresponding architectural register is written. In one embodiment, setting bits includes setting bits in a row of the bypass directory to a first logical state. For example, bits in a row of the bypass directory can be set to a logical 1 value.

In block 320, bits are cleared in the bypass directory each cycle. In one embodiment, clearing bits includes clearing a bit to a second logical state in a current column at the end of each cycle. For example, bits in a column of the bypass directory can be cleared to a logical 0 value.

At block 330, a head pointer is changed. In one embodiment, the head pointer points to the current column in the bypass directory. In one exemplary implementation, a head pointer is incremented. For example, the change corresponds to a rotation of a one-hot encoded head pointer.

At block 330, the location of a given architectural register's most recent result is determined based upon a configuration of the bits. In one embodiment, the determining includes examining the bits for a transition point from a first logical state to a second logical state. In effect, the transition point indicates how many cycles ago processing information was written; from this information can be derived the location of the desired result in the bypass register file. In one embodiment, processing information is retrieved from a architectural file register if examining the bits indicates logical states in a row are the second logical state.

FIGS. 5A through 5F are exemplary block diagrams of the updates to a bypass directory for five architectural registers R0 through R4, and a 4-stage result pipeline. The entries or slots in the bypass register file for the 4-stage pipeline are named A through D. The shaded column designation A through D shows the current head pointer (which also determines where in the bypass register file the next result will be stored). The shaded blocks within the bypass directory show the 0-to-1 transition in the row of state bits, which indicates where in the bypass register file the result is located. FIGS. 5A through 5F show the evolution of the directory state over six cycles.

Figures 5A, 5B, 5C, 5D, 5E, 5F:
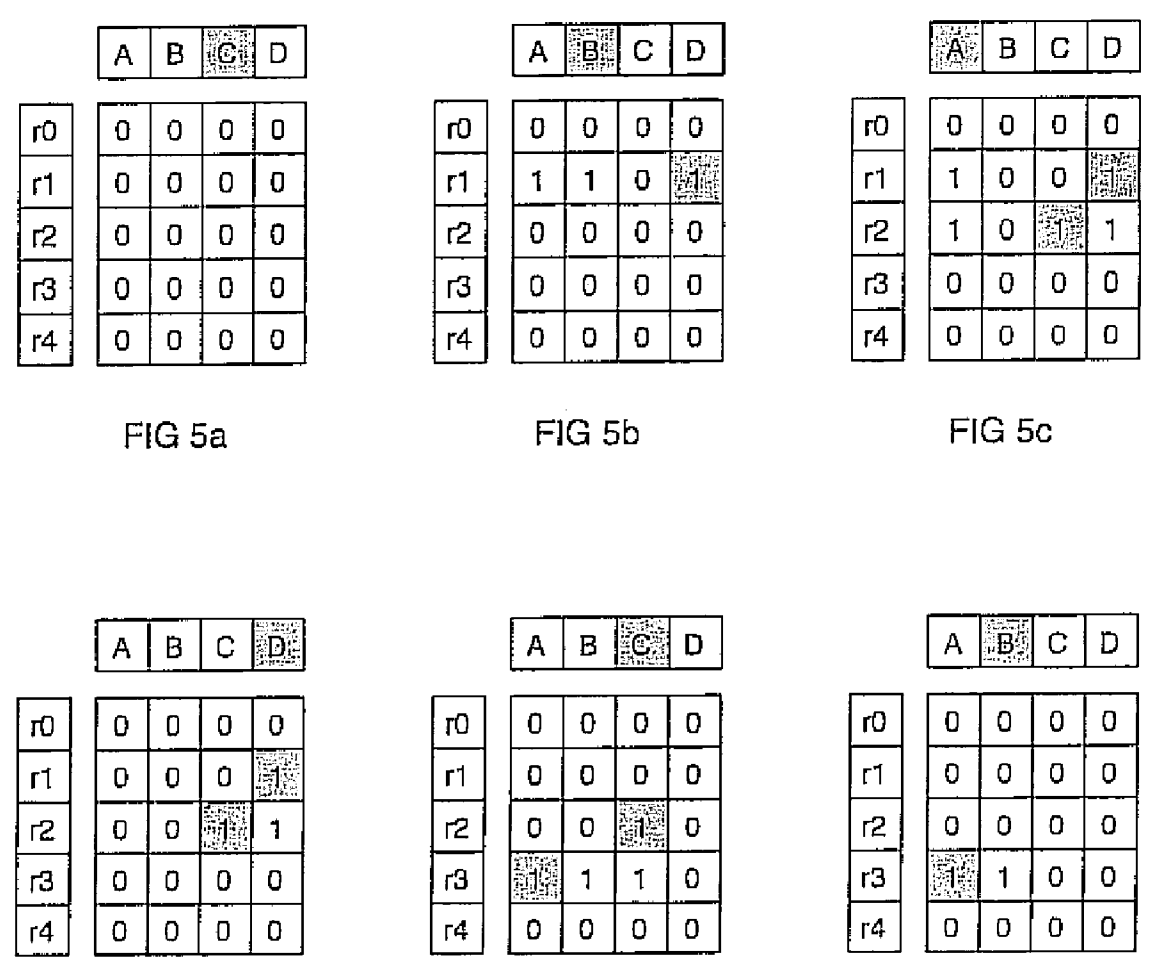

FIG. 5A shows cycle (a) corresponding to an initial state of the table, where the five architectural registers reside in the architectural register file. FIG. 5B shows cycle (b) corresponding to a state of the directory after register R1 is written. The most up-to-date value of R1 will be found in slot D of the bypass register file; it remains available in this slot through cycle (d). FIG. 5C shows cycle (c), when register R2 is written. Since one more cycle has elapsed, its result is stored in bypass register file slot C. FIG. 5D shows cycle (d), where no new writes are performed and the latest value for R1 is written back to the architectural register file. Correspondingly, the table update next clears the last bit in row R1, indicating that the value is no longer in the bypass register file. FIG. 5E shows cycle (e) in which register R3 is written (into slot A) and the result for R2 retires to the architectural register file. FIG. 5F shows the result for R2 is no longer available in the bypass register file starting in cycle (f).

In one embodiment, directory table updates are performed one cycle later and an indication of which entries in the bypass register file were updated is recorded. This permits the current state to be read from a directory entry while writing a new state at the same time. In that case, if one of the to-be-updated directory entries is read in the next cycle, this can be detected by CAMing against the record of pending updates, and ignoring the output of the directory. In one exemplary implementation, when such a match happens, an instruction is reading the result of the immediately preceding instruction and the values are critical and receive special bypass handling as set forth above (e.g., fed directly from a computation component into selection component and back to computation component). Thus, if the directory delivers an invalid or incorrect entry, "reading" the invalid or incorrect entry from the bypass register file is not a problem.

In one embodiment, a bypass directory includes two write ports, one that writes logical one values to selected rows, and a second write port that is used to clear columns across the array. When there are multiple units each producing a new result per cycle, the directory must be capable of updating a corresponding number of rows in the directory simultaneously, so additional write ports are needed. Observe that even as multiple rows are written in the same cycle, they will be set to the exact same value (e.g., logical ones everywhere, or logical ones everywhere but the current column).

Also, when there are multiple functional units producing results, the directory may record which unit has produced a given result, so a different portion of the bypass register can be accessed.

It is appreciated that present invention bypass techniques and schemes can be implemented in a variety of configurations. In one embodiment a "countdown" counter is started that tracks how long processing information is available in a bypass register file (e.g., until a the bypass register file "slot" may be reused for another result). To determine from where to bypass a given source register, a register's entry is read in the directory. If the counter has reached zero the value is read from the architectural register file. Otherwise, the value from the bypass register slot that is recorded in the directory table is read. It is also appreciated that a bypass directory table and a bypass tracking process can be utilized to control a bypass feed back multiplexer in a conventional bypass system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
a processor; and
memory coupled to said processor and having stored therein instructions that are executable by said system, wherein said instructions comprise:
instructions to set, in a first cycle, a sequence of bits in a bypass directory to a first logical state when a corresponding architectural register is written;
instructions to set a bit in said sequence to a second logical state in a second cycle subsequent to said first cycle; and
instructions to determine which stage of a bypass register file processing information is at based upon a location of said bit in said sequence.

2. The system of claim 1 wherein said instructions further comprise instructions to rotate a head pointer to set said bit.

3. The system of claim 1 wherein a head-pointer is indicated via one-hot encoding.

4. The system of claim 1 wherein said instructions further comprise instructions to set said bits in a row of said bypass directory.

5. The system of claim 1 wherein said instructions further comprise instructions to clear said bits selectively in said bypass directory each cycle.

6. The system of claim 1 wherein said instructions further comprise instructions to examine said bits for a transition point from said first logical state to said second logical state.

7. The system of claim 6 wherein said transition point indicates how many cycles after said first cycle said processing information was written.

8. The system of claim 7 wherein processing information is retrieved from an architectural file register if said examining of said bits indicates logical states in a row of said bypass directory are in said second logical state.

9. The system of claim 1 wherein said instructions further comprise instructions to record for each architectural register which of a plurality of functional units produced the most recent result.

10. A computer-readable storage medium having stored thereon computer-executable instructions comprising:
   processing instructions for processing information and delivering results of said processing to a data path; and
   bypass tracking instructions for tracking progress of said results through said data path, said bypass tracking component also for storing bypass path stage indications in a bypass directory table, manipulating said bypass path stage indications to correspond to progress of processing information through a bypass path, and interpreting said bypass path stage indications.

11. The computer-readable storage medium of claim 10 wherein rows of said bypass directory table correspond to an architectural register associated with said bypass path and columns of said bypass directory table correspond to progress through stages of said bypass path.

12. The computer-readable storage medium of claim 10 wherein said bypass directory table comprises as many rows as architectural registers, wherein each of said rows contains as many status bits as there are pipeline stages.

13. The computer-readable storage medium of claim 12 wherein each row additionally comprises a number of bits for encoding which of a plurality of functional units produced a result.

14. The computer-readable storage medium of claim 10 wherein said bypass directory table has a number of write ports corresponding to a number of results per cycle.

15. The computer-readable storage medium of claim 10 wherein said bypass directory table has a number of read ports corresponding to a number of processing source operands.

16. A system comprising:
   a processor; and
   a memory coupled to said processor and having stored therein instructions, wherein said system is operable for performing operations according to said instructions, wherein said instructions comprise:
   instructions to store bypass path stage indications in a bypass directory table;
   instructions to manipulate said bypass path stage indications to correspond to progress of processing information through a bypass path; and
   instructions to interpret said bypass path stage indications.

17. The system of claim 16 wherein rows of said bypass directory table correspond to an architectural register associated with said bypass path and columns of said bypass directory table correspond to progress through stages of said bypass path.

18. The system of claim 16 wherein said bypass directory table comprises as many rows as architectural registers, wherein each of said rows contains as many status bits as there are pipeline stages.

19. The system of claim 18 wherein each row additionally comprises a number of bits for encoding which of a plurality of functional units produced a result.

20. The system of claim 16 wherein said bypass directory table has a number of write ports corresponding to a number of results per cycle.

21. The system of claim 16 wherein said bypass directory table has a number of read ports corresponding to a number of processing source operands.

22. The system of claim 16 wherein said instructions further comprise:
   instructions to produce select signals based on said bypass path stage indications; and
   instructions to use said select signals to determine said progress of said processing information through stages of said bypass path.

23. The system of claim 22 wherein said instructions further comprise instructions to AND pairs of said bypass path stage indications to produce said select signals, wherein said progress is determined according to which of said select signals has a binary value different from the rest of said select signals.

24. The system of claim 22 wherein said instructions further comprise:
   instructions to rotate a head pointer to set said bypass path stage indications;
   instructions to AND pairs of bypass path stage indications to produce first outputs;
   instructions to AND said first outputs with an encoded value representing a position of said head pointer to produce second outputs; and
   instructions to OR said second outputs to produce said select signals, wherein said progress is determined according to which of said select signals has a binary value different from the rest of said select signals.

25. The system of claim 1 wherein said instructions further comprise:
   instructions to produce select signals based on said sequence of bits; and
   instructions to determine said stage of said bypass register file according to said select signals.

26. The system of claim 1 wherein said instructions further comprise:
   instructions to AND pairs of bits in said sequence of bits to produce select signals; and
   instructions to identify said stage of said bypass register file according to which of said select signals has a binary value different from the rest of said select signals.

27. The system of claim 2 wherein said instructions further comprise:
   instructions to AND bits in said sequence of bits to produce first outputs;
   instructions to AND said first outputs with an encoded value representing a position of said head pointer to produce second outputs;
   instructions to OR said second outputs to produce select signals; and
   instructions to identify said stage of said bypass register file according to which of said select signals has a binary value different from the rest of said select signals.

* * * * *